United States Patent
Noh et al.

(10) Patent No.: US 9,730,069 B2
(45) Date of Patent: Aug. 8, 2017

(54) MOBILE TERMINAL AND METHOD OF CONTROLLING THE MOBILE TERMINAL

(71) Applicant: LG ELECTRONICS INC., Seoul (KR)

(72) Inventors: Hyunyong Noh, Seoul (KR); Jungsu Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/187,825

(22) Filed: Feb. 24, 2014

(65) Prior Publication Data
US 2014/0273964 A1    Sep. 18, 2014

(30) Foreign Application Priority Data

Mar. 15, 2013  (KR) .................. 10-2013-0028195

(51) Int. Cl.
| | |
|---|---|
| *H04W 12/08* | (2009.01) |
| *H04W 12/06* | (2009.01) |
| *G06F 21/32* | (2013.01) |
| *H04W 4/02* | (2009.01) |
| *H04W 88/02* | (2009.01) |

(52) U.S. Cl.
CPC ............ *H04W 12/08* (2013.01); *G06F 21/32* (2013.01); *H04W 12/06* (2013.01); *G06F 2221/2111* (2013.01); *H04W 4/02* (2013.01); *H04W 88/02* (2013.01)

(58) Field of Classification Search
CPC ..... H04W 88/02; H04W 12/12; H04W 12/08; H04W 12/06; H04L 63/08
USPC ............. 455/411; 340/5.51, 5.52, 5.61, 5.83; 345/156
See application file for complete search history.

(56) References Cited

U.S. PATENT DOCUMENTS

| | | | | |
|---|---|---|---|---|
| 8,749,516 | B2* | 6/2014 | Kim ...................... | G06F 1/1643 345/174 |
| 8,990,580 | B2* | 3/2015 | Matsuoka ............. | H04L 9/3231 340/5.83 |
| 9,460,070 | B2* | 10/2016 | Roh ....................... | G06F 17/241 |
| 9,519,771 | B2* | 12/2016 | Fadell ................... | G06F 21/316 |

(Continued)

FOREIGN PATENT DOCUMENTS

| | | |
|---|---|---|
| CN | 101828162 A | 9/2010 |
| CN | 102075619 A | 5/2011 |

(Continued)

*Primary Examiner* — Kamran Afshar
*Assistant Examiner* — Farideh Madani
(74) *Attorney, Agent, or Firm* — Birch, Stewart, Kolasch & Birch, LLP

(57) ABSTRACT

A mobile terminal including a display unit on which objects corresponding to at least one selected application from among multiple applications executable on the mobile terminal are output in a locked mode; a user identification unit that identifies at least one user of the mobile terminal and determines whether the at least one user is authorized to cancel the locked mode; and a controller that only grants access for at least one individually assigned application among the multiple applications to the user authorized to cancel the locked mode of the mobile terminal. The at least one user has access to only at least one assigned function among multiple functions included in the at least one individually assigned application.

18 Claims, 12 Drawing Sheets

(56) References Cited

U.S. PATENT DOCUMENTS

| | | |
|---|---|---|
| 2009/0006991 A1 | 1/2009 | Lindberg et al. |
| 2009/0203356 A1* | 8/2009 | Li .................. H04W 8/205 455/411 |
| 2009/0265670 A1* | 10/2009 | Kim .................. G06F 3/04883 715/863 |
| 2011/0294467 A1* | 12/2011 | Kim .................. G06F 1/1643 455/411 |
| 2012/0081282 A1 | 4/2012 | Chin |
| 2012/0129496 A1* | 5/2012 | Park .................. G06F 3/0488 455/411 |
| 2012/0235790 A1* | 9/2012 | Zhao .................. G06F 21/32 340/5.83 |
| 2012/0299847 A1* | 11/2012 | Kwon .................. G06F 9/441 345/173 |
| 2013/0078951 A1* | 3/2013 | Mun .................. G06F 21/305 455/411 |
| 2013/0093707 A1* | 4/2013 | Park .................. G06F 21/31 345/173 |
| 2013/0283212 A1 | 10/2013 | Zhu et al. |
| 2013/0298226 A1* | 11/2013 | Fang .................. H04M 1/67 726/20 |
| 2014/0038557 A1* | 2/2014 | Kim .................. H04W 12/06 455/411 |
| 2014/0155031 A1* | 6/2014 | Lee .................. G06F 21/35 455/411 |
| 2014/0283012 A1* | 9/2014 | Eggerton .............. G06F 21/31 726/19 |

FOREIGN PATENT DOCUMENTS

| | | |
|---|---|---|
| CN | 102930196 A | 2/2013 |
| EP | 2230623 A1 | 9/2010 |

* cited by examiner

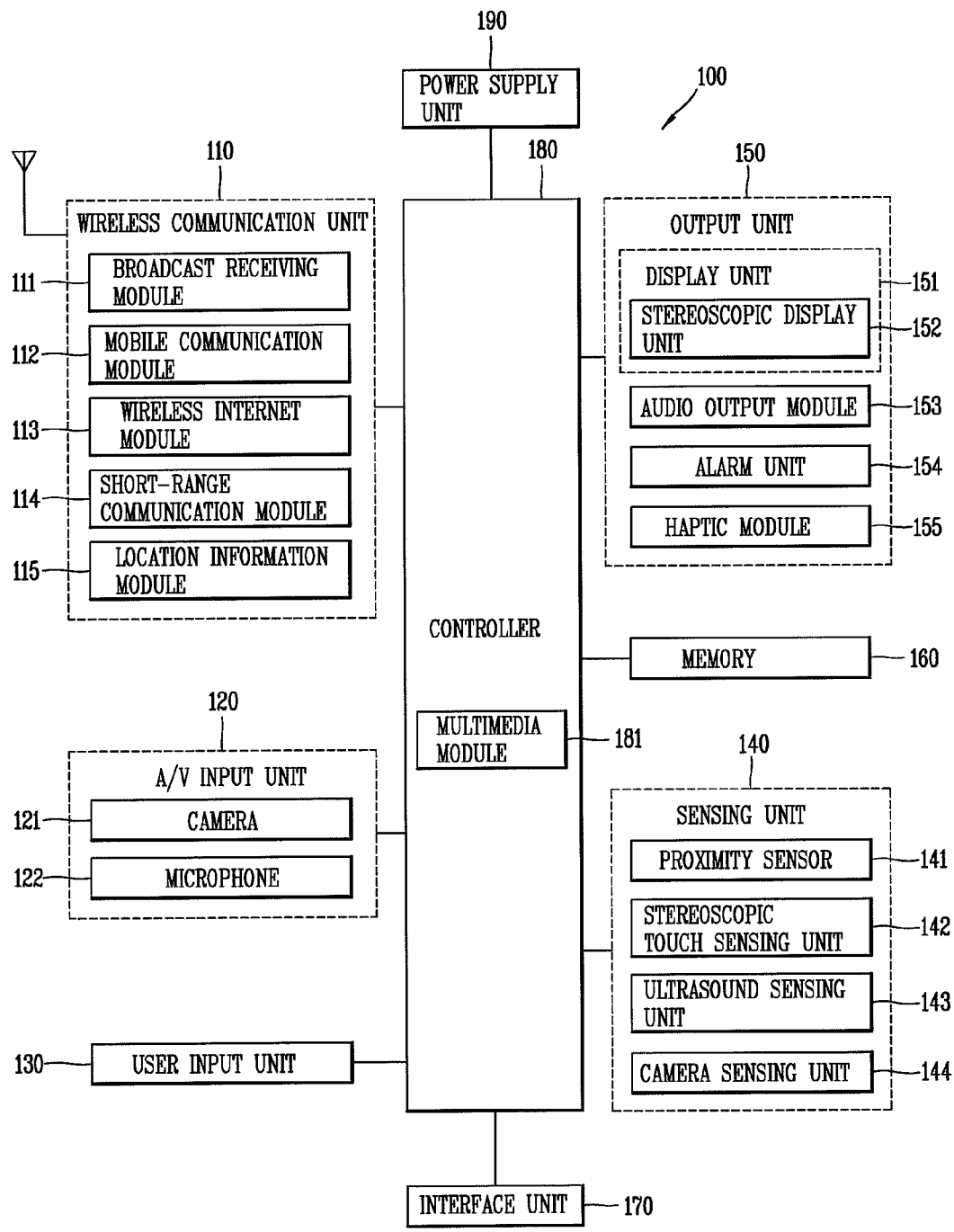

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0028195, filed on Mar. 15, 2013, the contents of which is incorporated by reference herein in its entirety.

BACKGROUND OF THE INVENTION

1. Field of the Invention

The present invention relates to a mobile terminal in which a touch input is possible and a method of controlling the mobile terminal.

2. Background of the Invention

Mobile terminals may be divided into mobile/portable terminals and stationary terminals. Also, mobile terminals may be classified into handheld terminals and vehicle mount terminals.

Mobile terminals can be configured to capture still images or moving images, play music or video files, play games, receive broadcast and the like, so as to be implemented as integrated multimedia players. Many efforts to improve mobile terminals include not only changes and improvement of structural components implementing mobile terminals but also software improvements to support and improve functions of the mobile terminals.

However, mobile terminals in related art have an inconvenience of inputting predetermined criteria and canceling a locked mode to execute a specific application in the locked mode. In addition, mobile terminals in related art do not consider application features and user preferences when the locked mode is canceled and all applications are in an executable state.

SUMMARY OF THE INVENTION

Therefore, an aspect of the detailed description is to provide a mobile terminal that is capable of providing a different application on a user-by-user basis and of improving user convenience in canceling a locked mode and a method of controlling the mobile terminal.

To achieve these and other advantages and in accordance with the purpose of this specification, as embodied and broadly described herein, there is provided a mobile terminal including a display unit on which objects corresponding to some applications selected from among the multiple applications executable on the mobile terminal are output in a locked mode, a user identification unit that identifies a user of the mobile terminal and determines whether the user of the mobile terminal is authorized to cancel the locked mode, and a controller that performs control in such a manner that among the multiple applications executable on the mobile terminal, the user of the mobile terminal who is authorized to cancel the locked mode has access to only the application individually assigned to the user of the mobile terminal, in which the controller performs the control in such a manner that among functions included in the application assigned to the user of the mobile terminal, the user of the mobile terminal has access to only the assigned function.

In the mobile terminal, when the object corresponding to the application that is output in the locked mode is selected, the controller may perform the control in such a manner that among the functions included in the application corresponding to the selected object, only the assigned function is accessible.

In the mobile terminal, the user identification unit may recognize and photograph a face of the user of the mobile terminal facing toward the display unit with a camera integrated into a main body of the mobile terminal, compare an image of the photographed face of the user of the mobile terminal against images of the multiple users who are authorized to cancel the locked mode, and determine whether the user of the mobile terminal is authorized to cancel the locked mode.

In the mobile terminal, the controller may perform the control in such a manner that an object indicating whether the user of the mobile terminal is authorized to cancel the locked mode is output to the display unit.

In the mobile terminal, the controller may perform the control in such a manner that an identification object individually assigned to the user of the mobile terminal who is authorized to cancel the locked mode is output to the display unit.

In the mobile terminal, the controller may perform the control in such a manner that an indicator indicating a location for recognizing the face of the user of the mobile terminal and an indicator indicating a current location of the face of the user of the mobile terminal are output to the display unit.

In the mobile terminal, the controller may perform the control in such a manner that a region for recognizing the face of the user of the mobile terminal is displayed on the display unit along with the application executed by the user of the mobile terminal.

In the mobile terminal, the controller may perform the control in such a manner that an image effect indicating the extent to which a region where the face of the user is currently recognized matches with a region for recognizing the user's face is output to the display unit.

In the mobile terminal, the controller may perform the control in such a manner that the extent to which image processing associated with the image of the face of the user of the mobile terminal has been made is output to the display unit.

To achieve these and other advantages and in accordance with the purpose of this specification, as embodied and broadly described herein, there is provided a method of controlling a mobile terminal, including outputting objects corresponding to some applications selected from among the multiple applications executable on the mobile terminal, in a locked mode, identifying a user of the mobile terminal and determining whether the user of the mobile terminal is authorized to cancel the locked mode, and performing control in such a manner that among the multiple applications executable on the mobile terminal, the user of the mobile terminal who is authorized to cancel the locked mode has access to only the application individually assigned to the user of the mobile terminal, in which the performing of the control includes performing the control in such a manner that among functions included in the application assigned to the user of the mobile terminal, the user of the mobile terminal has access to only the assigned function.

In the method, when the object corresponding to the application that is output in the locked mode is selected, the outputting of the objects may include performing the control in such a manner that among the functions included in the application corresponding to the selected object, only the assigned function is accessible.

In the method, the identifying of the user may include recognizing and photographing a face of the user of the mobile terminal facing toward the display unit with a camera integrated into a main body of the mobile terminal, comparing an image of the photographed face of the user of the mobile terminal against images of the multiple users who are authorized to cancel the locked mode, and determining whether the user of the mobile terminal is authorized to cancel the locked mode.

In the method, the identifying of the user may include performing the control in such a manner that an object indicating whether the user of the mobile terminal is authorized to cancel the locked mode is output to the display unit.

In the method, the identifying of the user may include performing the control in such a manner that an identification object individually assigned to the user of the mobile terminal who is authorized to cancel the locked mode is output to the display unit.

In the method, the identifying of the user may include performing the control in such a manner that an indicator indicating a location for recognizing the face of the user of the mobile terminal and an indicator indicating a current location of the face of the user of the mobile terminal are output to the display unit.

In the method, the identifying of the user may include performing the control in such a manner that a region for recognizing the face of the user of the mobile terminal is displayed on the display unit along with the application executed by the user of the mobile terminal.

In the method, the identifying of the user may include performing the control in such a manner that an image effect indicating the extent to which a region where the face of the user is currently recognized matches with a region for recognizing the user's face is output to the display unit.

In the method, the identifying of the user may include performing the control in such a manner that the extent to which image processing associated with the image of the face of the user of the mobile terminal has been made is output to the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram illustrating a mobile terminal according to an embodiment of the present invention;

DETAILED DESCRIPTION OF THE INVENTION

Figure 2A:
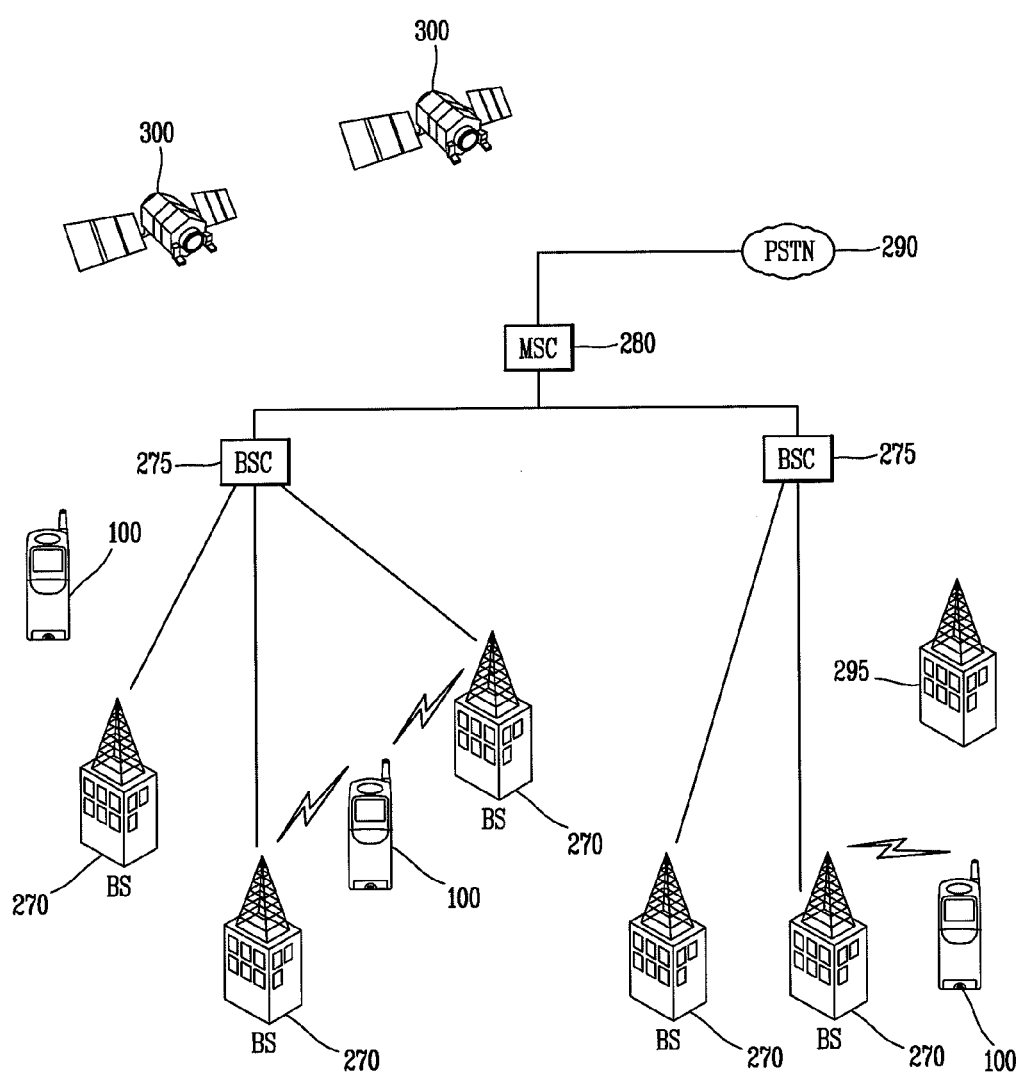
FIGS. 2A and 2B are diagrams illustrating a conceptional framework of a telecommunication system in which the mobile terminal according to the present invention operates.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment. The mobile terminal 100 includes components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, a user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image includes a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit. The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor converts changes of a pressure applied to a specific part of the display unit 151, or a capacitance occurring from a specific part of the display unit 151, into electric input signals. Also, the touch sensor senses not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter stereoscopic touch screen), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively. Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal. The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a communication system which is operable with the mobile terminal 100 according to the present disclosure will be described. In particular, FIGS. 2A and 2B are conceptual views of a communication system operable with a mobile terminal in accordance with the present disclosure.

Figure 2B:
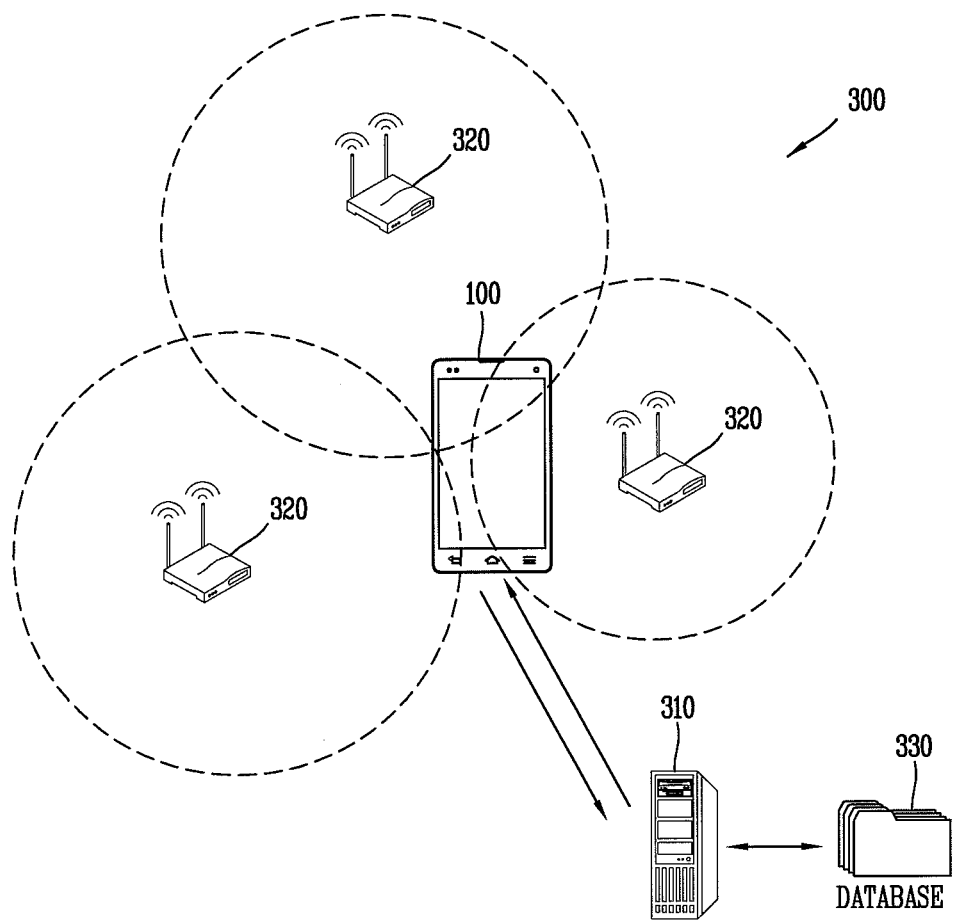

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
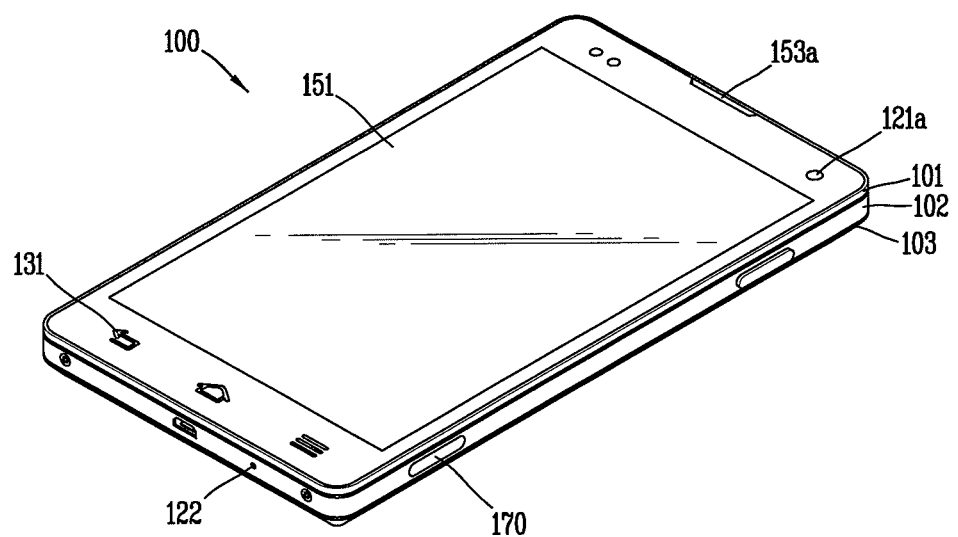
FIG. 3A is a perspective diagram illustrating the mobile terminal according to an embodiment of the present invention when viewed from the front.

Next, FIG. 3A is a front perspective view illustrating an embodiment of the mobile terminal 100 according to the present invention.

The mobile terminal 100 disclosed herein is provided with a bar-type terminal body. However, the present invention is not limited to this, but is applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and include a structure for enhancing the visibility of a touch screen at bright places. Referring to FIG. 3A, the display unit 151 occupies a most portion of the front surface of the front case 101. The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

In addition, the user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being output from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
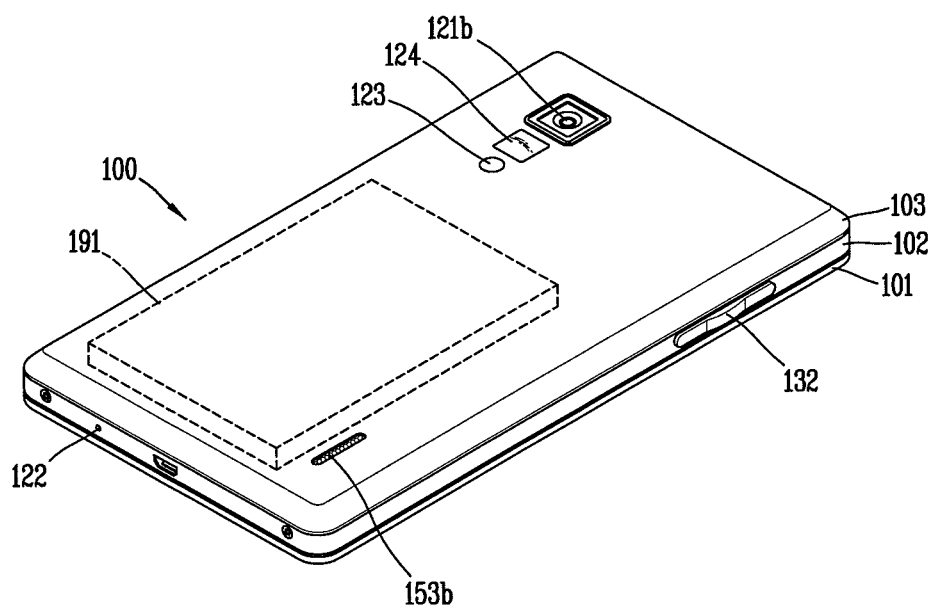
FIG. 3B is a perspective diagram illustrating the mobile terminal in FIG. 3A when viewed from the rear.

Next, FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. The battery cover 103 is combined with the rear case 102 to cover the battery 191, thereby restricting the battery 191 from being released and protecting the battery 191 from external shocks and foreign substances.

A lock mode of the mobile terminal 100 means a restricted usage state of the mobile terminal 100 before preset specific authentication information is input. The authentication information may include a password, a touch pattern, a personal identification number (PIN), a user's fingerprint or facial image, etc.

In order to release the lock mode, such authentication information is additionally input. However, because all applications can be executed only after the lock mode is released, it is not possible for a user to control a mobile terminal in a lock mode if the mobile terminal does not consider applications and a user's personal characteristics.

Accordingly, a mobile terminal 100, capable of providing a different application on a user-by-user basis and of improving user convenience in canceling a locked mode and a method of controlling the mobile terminal 100 are described below referring to the accompanying drawings.

Figure 4:
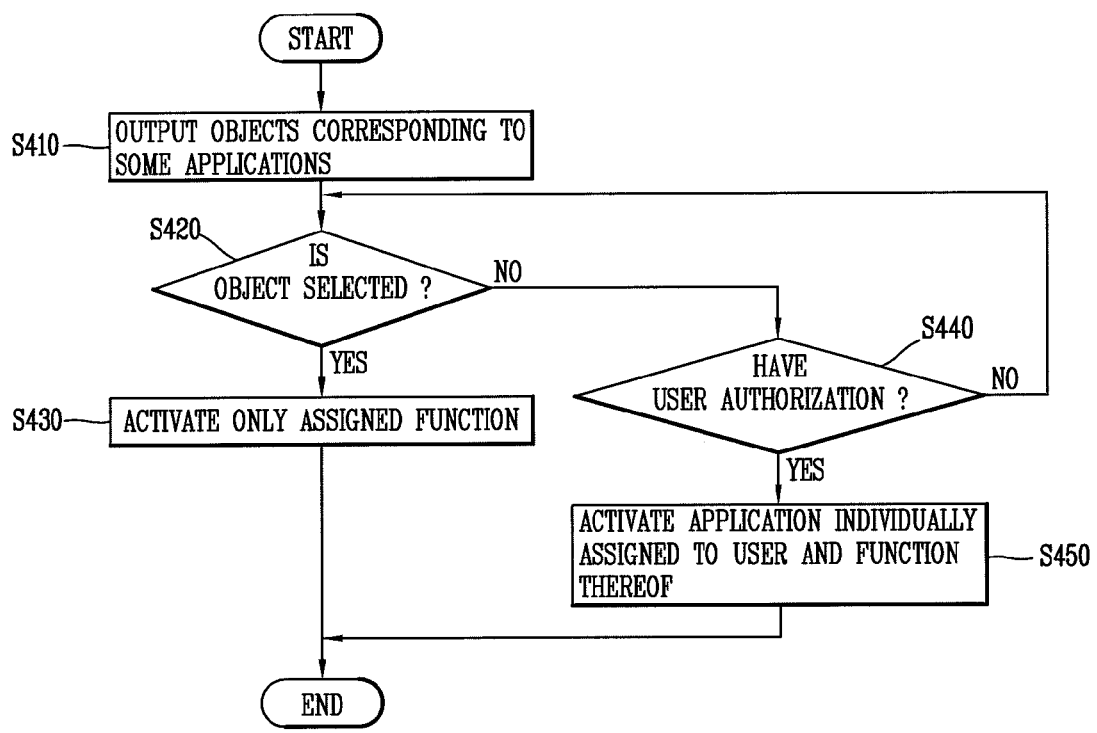
FIG. 4 is a flowchart for describing a mobile terminal according to an embodiment of the present invention.

Next, FIG. 4 is a flowchart for describing the mobile terminal 100 according to an embodiment of the present invention. Referring to FIG. 4, objects corresponding to some applications selected from among the multiple applications executable on the mobile terminal 100 are output to the display unit 151 in a mode of locking the mobile terminal 100 (S410).

In addition, criteria for the selection of some applications from the multiple are variously set up and are not limited to a specific embodiment. The specifics associated with this are described below.

Subsequently, when the object corresponding to the application that is output in the locked mode is selected (S420), and a control (activation) takes place to allow access to only a function assigned among functions included in the application corresponding to the selected object (S430).

Specifically, if the object corresponding to the application is selected before determining whether a user of the mobile terminal 100 is authorized to cancel the locked mode (S440), the access to only the designated function among the functions included in the application corresponding to the selected object is allowed (S430).

That is, even the user who is not authorized to cancel the locked mode can execute (access) the selected applications without having to go through a particular authentication procedure. Accordingly, it is preferable that the selected application corresponding to the object that is output in the locked mode is not associated with a specific user. In addition, it is preferable that a function not associated with a specific user be designated as an accessible function.

Here, the application not associated with the user means an application through which personal information on or personal privacy of a specific user is not disclosed. Likewise, the function not associated with a specific user among the function included in the selected application means a function through which the personal information on or the personal privacy of a specific user is not disclosed.

According to an embodiment relating to this, among a calendar application, a browse application and a diary application executable on the mobile terminal 100, only the object corresponding to the calendar application or the browser application can be output in the locked mode. In addition, a bookmark function (a favorite-adding function) included in the browser application or a personal schedule function included in the calendar application has a limited use.

According to another embodiment, an object corresponding to an application that needs to be speedily executed without canceling the locked mode can be output in the locked mode.

According to a specific embodiment, an object corresponding to a telephony application can be output in the locked mode. In addition, if the object corresponding to the telephony application is selected before determining whether the user is authorized to cancel the locked mode (S440), only a function of receiving a call or a function of making an emergency call can be limitedly used. Accordingly, time can be saved that takes to cancel the locked mode in an emergency.

Consequently, the access to the application that is limited across the board in the locked mode is set as flexibly allowable considering features of the application. On the other hand, designated functions of some applications can be executed in Step S430, but it has yet to be determined whether the user is authorized to cancel the locked mode. Accordingly, this state is defined as a guest mode. In contrast, Steps S410, S420, and S440 are defined as the locked mode being in effect, and Step S450 is defined as the locked mode being canceled.

Referring back to FIG. 4, in a state where the object corresponding to the application that is output in the locked mode is not selected, the user identification unit 182 identifies the user of the mobile terminal 100 and thus determines whether the user of the mobile terminal 100 is authorized to cancel the locked mode (S440).

Specifically, the user identification unit 182 determines whether the user of the mobile terminal 100 is authorized to cancel the locked mode, by using various authentication information described above (S440). When it is determined that the user of the mobile terminal 100 is not authorized to cancel the locked mode (S440), the process returns back to determining whether the object corresponding to the application is selected (S420).

On the other hand, when it is determined that the user of the mobile terminal 100 is authorized to cancel the locked mode (S440), the mobile terminal 100 is controlled (activated) to allow the user access to only the application individually assigned to the user of the mobile terminal 100 among the multiple applications executable on the mobile terminal 100 (S450).

In addition, the mobile terminal 110 is controlled (activated) to allow the access to only the assigned function among the functions included in the application assigned to the user of the mobile terminal 100 (S450).

That is, an executable (accessible) application and an executable (accessible) function thereof are differently assigned on a basis of the user who is authorized to cancel the locked mode. For example, a program assignment and a function assignment are made such that an owner of the mobile terminal 100 can execute all the applications installed on the mobile terminal 100 and all the functions included in each. Accordingly, when the user identification unit 182 determines that the user is the owner, the controller 180 activates all the applications and all the function of each.

In addition, the program assignment and the function assignment are made such that a first user can execute only both a first application and a second application and a second user can execute only both the second application and a third application. In addition, the program assignment and function assignment are made such that among a first function and a second function included in the second application, the first user can execute only the first function, and the second user can execute the second function.

Accordingly, when the user identification unit 182 determines that the user is the first user, the controller 180 activates (makes accessible) the first application and the second application. In addition, among the functions included in the second application, only the first function can be activated.

Likewise, when the user identification unit 182 determines that the user is the second user, the controller 180 activates (makes accessible) the second application and the third application. In addition, among the functions included in the second application, only the second function can be activated.

Data on the setting (the assignment) of the applications and the functions of each that are executable (accessible) on a user-by-user basis are set in advance or directly by the owner. In addition, the applications accessible by other users than the owner can be set by default. In addition, the data are stored in a memory 160 or a separate database.

Consequently, application features and user preferences can be individually considered because the accessible application can be assigned on a user-by-user basis.

On the other hand, the mobile terminal 100 determines whether the user is authorized to cancel the locked mode (S440) after executing Step S430 or concurrently when executing Step S430. For example, in the guest mode (S430), Step S440 may be executed in which the user is identified continuously or for every identification period that is set in advance. The specifics associated with this are described below.

Figure 5:
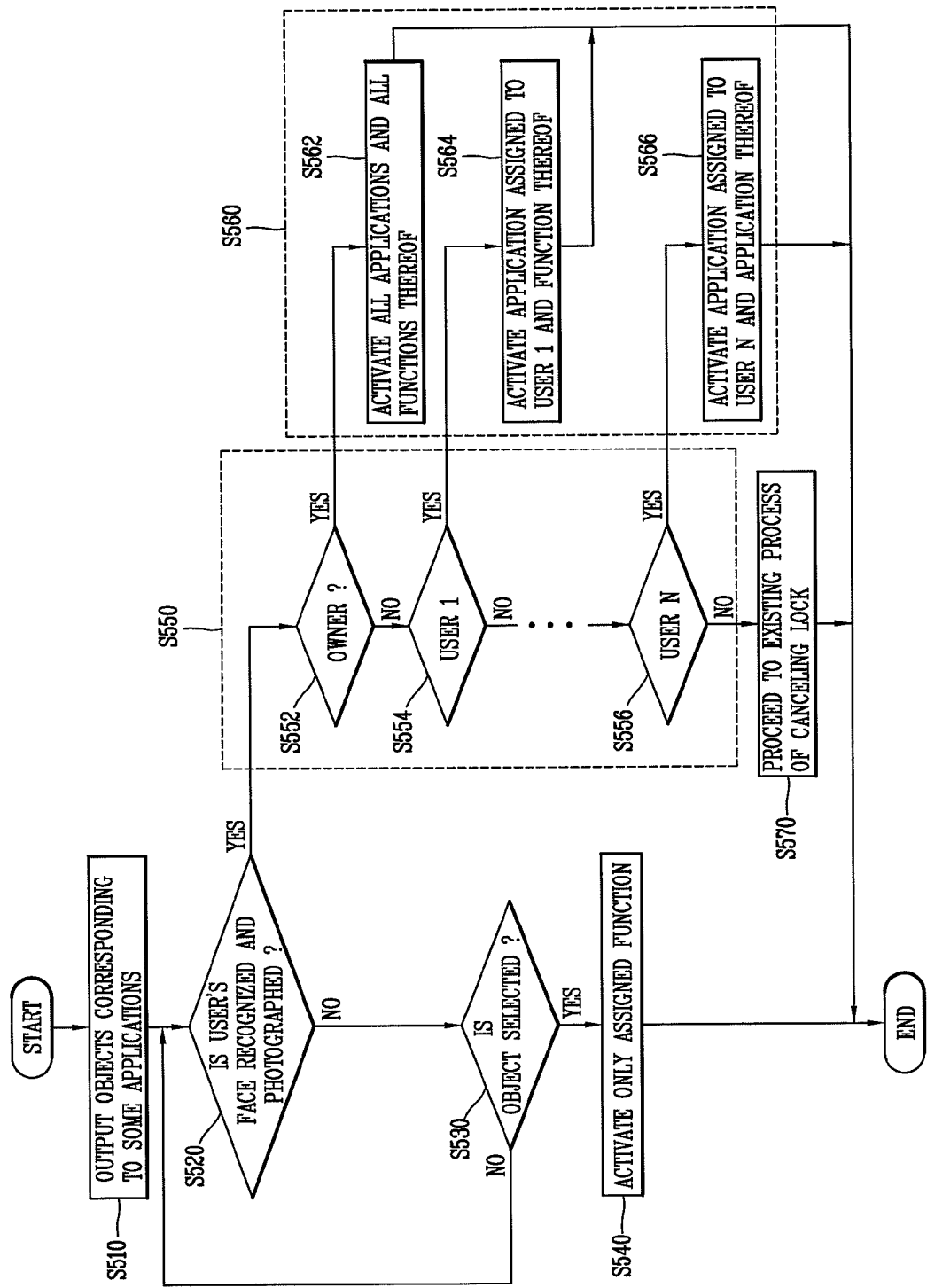
FIG. 5 is a flowchart for describing a mobile terminal according to another embodiment of the present invention.

Next, FIG. 5 is a flowchart for describing a method of controlling the mobile terminal 100 (refer to FIG. 1) according to another embodiment of the present invention. Specifically, FIG. 5 illustrates a face unlocking scheme according to the embodiment of the present invention.

Referring to FIG. 5, first, the objects corresponding to some applications selected from among the multiple applications executable on the mobile terminal 100 are output to the display unit 151 in the mode of locking the mobile terminal 100 (S510). In addition, Step S510 is executed in the same manner as the Step S410 described above.

Next, it is determined whether a face of the user of the mobile terminal 100 that faces toward the display unit 151 in the locked mode is recognized or photographed with a camera 121 integrated into a main body of the mobile terminal 100 (S520). In related art, a face recognition algorithm is used to recognize and photograph the user's face.

When the object corresponding to the application that is output in the locked mode is selected before recognizing and photographing the user's face (S530), the mobile terminal 100 is controlled to allow the access to the assigned function among the functions included in the application corresponding to the selected object.

In addition, Steps S530 and S540 are executed in the same manner as Steps S420 and S430 described above, respectively, and when the object corresponding to the application that is output in the locked mode is not selected (S530), Step S520 repeats itself.

As described above, the assigned functions of some applications can be executed in Step S540, but it has yet to be determined whether the user is authorized to cancel the locked mode. Accordingly, this state is defined as the guest mode. In contrast, Steps S510 to S530 and S550 are defined as the locked mode being in effect, and Step S560 is defined as the locked mode being canceled.

In this manner, after recognizing and photographing the user's face with the camera 121 (S520), the image of the photographed user of the mobile terminal 100 is compared against the images of the faces of the multiple users who are authorized to cancel the locked mode (S550).

Step S550 corresponds to the face unlocking scheme in Step 440 described above according to the embodiment. According to the specific embodiment, the image of the photographed face of the user of the mobile terminal 100 is compared against the images of the faces of the multiple users who are authorized to cancel the locked mode, which are set in advance and stored in the database, in order to determine whether the image of the photographed face matches with the image stored in the database. Accordingly, it is determined whether the user of the mobile terminal 100 is authorized to cancel the locked mode.

Then, the control (activation) takes place to allow the user of the mobile terminals 100 who is authorized to cancel the locked mode, included in the multiple users, to have access to only the application and the function thereof individually assigned to the user of the mobile terminal 100 (S560). Step S560 is executed in the same manner as the Step S450 described above.

After the comparison of images (S550) and the controlling of the user's access (S560), the mobile terminal 100 determines whether the user is the owner of the mobile terminal 100 (S552), and all the applications and all the functions thereof are activated if the user is determined to be the owner of the mobile terminal 100 (S562).

Subsequently, when it is determined that the user of the mobile terminal 100 is not the owner (S552), it is determined whether the user of the mobile terminal 100 is the first user (S554). In addition, when the user of the mobile terminal 100 is the first user (S554), the application and the function thereof are activated (S564).

Likewise, it is determined whether the user of the mobile terminal 100 is the second user, the third user, or an n-th user (n is a natural number) who is authorized to cancel the locked mode (S556), and thus the application and the function thereof assigned to the n-th user are activated (S566).

For this process, information relating to the images of the faces of the multiple users (the owner, the first user, the second user and so forth up to the n-th user) who are authorized to cancel the locked mode that is set in advance, the application and the function thereof assigned to them, and the like is stored in the separate database.

If the user of the mobile terminal 100 is not included in the multiple users who are authorized to cancel the locked mode, the existing process for canceling the locked mode is executed (S570). For example, the user is presented with a screen through which to input a password, a touch pattern, a personal identification number (PIN), and a user' fingerprint. In addition, the face unlocking scheme in the related art is performed or the face unlocking scheme according to the present invention is again performed.

On the other hand, although not illustrated in the flowchart in FIG. 5, Steps S550 and S560 may be executed after executing Step S540 or concurrently when executing Step S540. For example, in the guest mode (S540), Step S550 may be executed in which the user is identified continuously or for every identification period that is set in advance.

However, when a process of canceling a lock mode is concurrently being executed with an application individually assigned to a user of the mobile terminal 100, the user is not able to easily determine that the process of canceling the locking is in progress.

Figure 6:
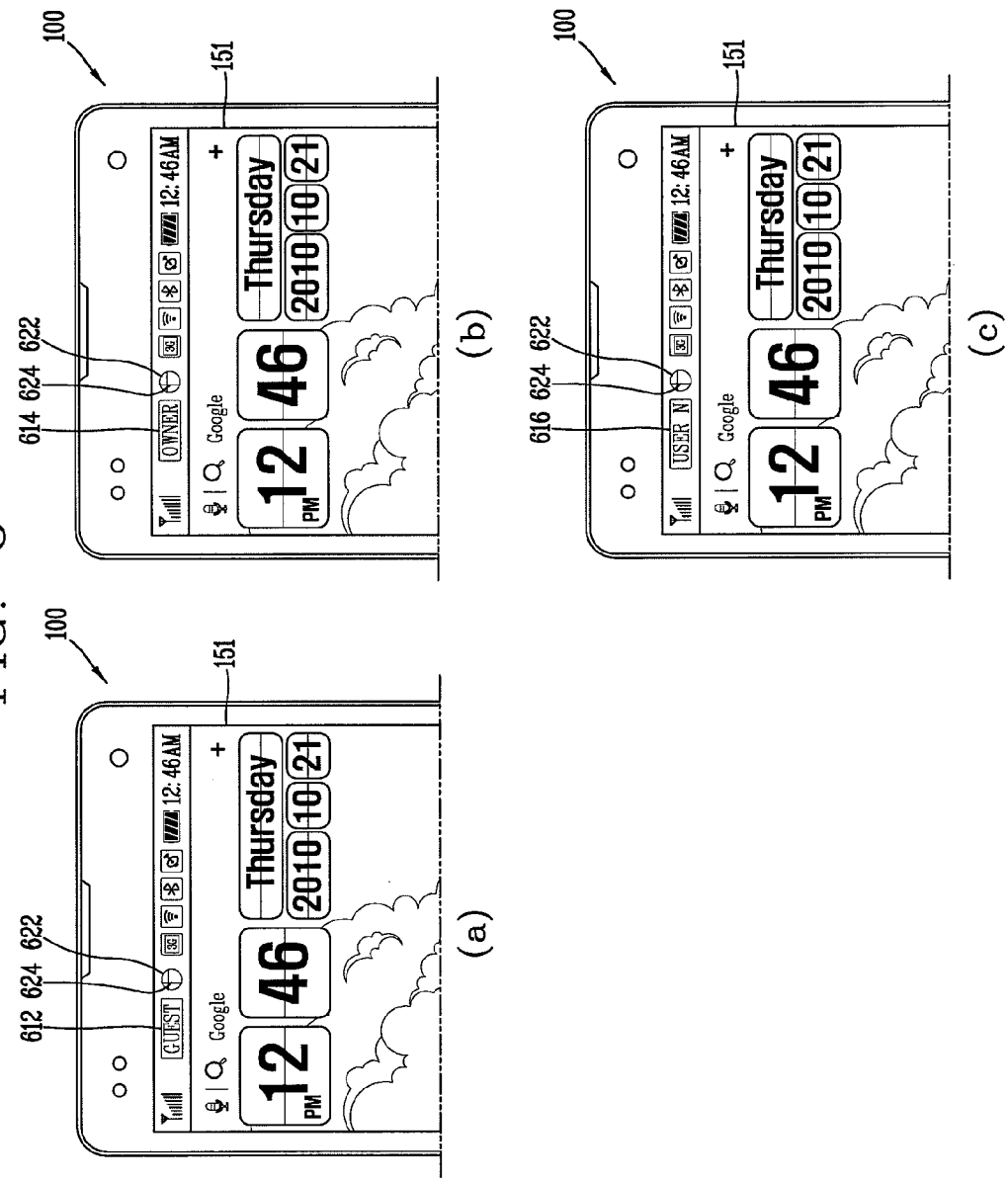
FIGS. 6A to 6C are diagrams illustrating a user interface on which to display user identification information and an object associated with recognition of a user's face, according to another embodiment.

Next, FIGS. 6A to 6C are diagrams illustrating the user interface on which to display user identification information and an object associated with recognition of the user's face according to another embodiment. In particular, the user identification information and the object associated with recognition of the user's face are displayed to inform the user determine that the process of canceling the locking is in progress.

Referring to FIGS. 6A to 6C, the user identification information and the object associated with the recognition of the face of the user of the mobile terminal 100 are output to a status bar on the display unit 151.

The user identification information includes an object indicating whether the user of the mobile terminal 100 is authorized to cancel the locked mode and an identification object that is individually assigned to the user of the mobile terminal 100 who is authorized to cancel the locked mode. The user identification information according to the embodiment includes GUEST 612, OWNER 614, and USER 1, USER 2 and so forth up to USER N 616 (N is a natural number).

Referring to FIG. 6A, GUEST 612 is output before recognizing and photographing the face of the user in the locked mode or before identifying the user in the locked mode. That is, GUEST 612 is output in Steps S510, S520, S550, and S570 described above.

In addition, when the object corresponding to the application is selected in the locked mode and the corresponding application is executed, GUEST 612 is output. That is, GUEST 612 is output in Steps S530 and S540 described above.

Consequently, GUEST 612 is output in the locked mode or in the guest mode in which some applications are executed.

Referring to FIG. 6B, when the user of the mobile terminal 100 is determined as the owner, OWNER 614 is output. That is, OWNER 614 is output in Steps S562 described above.

Referring to FIG. 6C, when the user of the mobile terminal 100 is determined as the user N, USER N 616 is output. That is, USER N 616 is output in Steps S566 described above.

The object associated with the recognition of the user's face indicates a location for exactly recognizing the face of the user of the mobile terminal 100 and includes an indicator 622 indicating the location for recognizing the face of the user of the mobile terminal 100 and an indicator 624 indicating a current location of the face of the user of the mobile terminal 100.

Referring to FIGS. 6A to 6C, the center of the user's face has to be positioned in the central point of the circular indicator 622 in order to exactly recognize the user's face. An indicator 624 indicating a current central location of the face is displayed in the form of a cross. The central location of the user's face is adjusted through the use of the indicator 624.

Accordingly, the user adjusts the central location of his/her face in such a manner that the center of his/her face matches with the central point of the indicator 622. In addition, a message, a pop-up window, an image effect, or the like is output that provides the user with guidance for matching with the central point of the indicator 622.

For example, when the center of the user's face is tilted to the left with respect to the center of the indicator 622, the pop-up window is output that instructs the user to move his/her face to the right. Alternately, an entire background screen is blurredly output. On the other hand, the object associated with the recognition of the user's face displays the extent to which image processing associated with the image of the user's face has been made.

Specifically, the image processing includes a sequence of processing such as recognizing and photographing the user's face and comparing the image of the photographed face of the user against the stored images of the multiple users. In addition, the extent to which the imaging processing has been made is displayed by using the indicator 622 indicating the location for recognizing the user's face.

For example, the circular indicator 622 is output in color that varies with the extent to which the image processing has been made, such as 50% process or 90% progress of the imaging processing. In addition, a separate indicator is used to display only the extent to which the imaging processing has been made.

The object associated with the recognition of the user's face disappears from the status bar when the recognition of the user's face is completed. That is, the object that is continuously displayed disappears in Steps S560 and S570.

According to another embodiment, because the user may be changed, the user's face is recognized continuously or every recognition period that is set in advance, and the indicator for recognizing the face is concurrently output.

In addition, the object associated with the user identification information and the recognition of the user's face, described above, may be output to other regions than the status bar. According to a specific embodiment, the object associated with the recognition of the user's face may be output to all regions of the display unit 151. The specifics associated with this is described in detail below.

Figure 7:
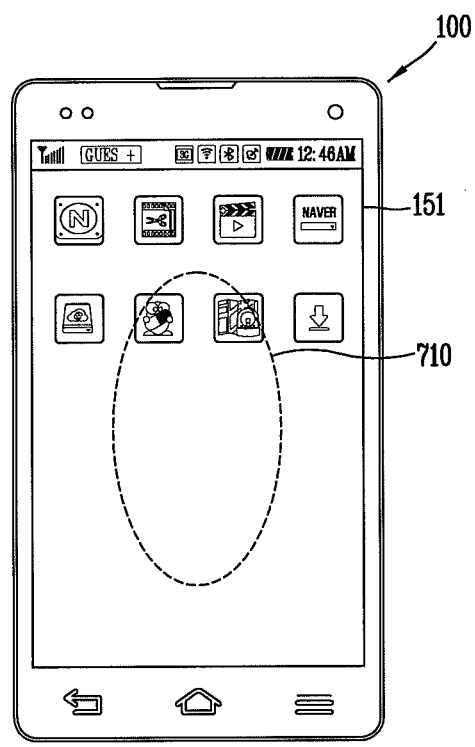
FIG. 7 is a diagram illustrating a user interface on which to display an object associated with recognition of the user's face, according to another embodiment.

Next, FIG. 7 is a diagram illustrating a user interface on which to display the object associated with the recognition of the user's face, according to another embodiment. Referring to FIG. 7, a region 710 for recognizing the face of the user of the mobile terminal 100 is output along with the application executed by the user of the mobile terminal 100.

According to a specific embodiment, the region 710 for recognizing the user's face is displayed blurredly compared to the other visual information (for example, an object that is output while the application is executed) displayed on the display unit 151.

In connection with the process in FIG. 5 described above, in Steps S510 to S530 and S550 in each of which the locked mode is in effect, the region 710 for recognizing the user's face is displayed along with the object corresponding to the application that is selectable in the locked mode.

In Step S540 in which the guest mode is in effect, the region 710 for recognizing the user's face is displayed also during the process of executing the selected application. That, the application that is being executed by the face unlocking scheme is continuously executed without any interruption.

On the other hand, the region 710 for recognizing the user's face does not need to be output in Step S569 in which the user has been recognized. However, the region 710 for recognizing the user's face may be output to recognize that the user has been changed.

According to the embodiment, the region 710 for recognizing the user's face may be output continuously or every recognition period that is set in advance in order to recognize that the user is changed from the first user to the second user.

In addition, an image effect is output that indicates the extent to which a region where the face of the user is currently recognized matches with the region 710 for recognizing the user's face.

According to a specific embodiment, when the region where the face of the user is currently recognized does not match with the region 710 for recognizing the user's face to the extent (for example, an area of the region) that is set in advance, the region 710 that is blurredly displayed may be displayed thickly or in a twinkling manner. Alternately, the whole screen may appear burred or dark.

According to embodiments referring to FIGS. 8A and 8C, FIGS. 9A to 9D, FIGS. 10A to 10D, FIGS. 10A to 10D, and FIGS. 11A to 11C, the assignment is made such that the owner can execute all the applications and all the functions thereof and other users other than the owner (or the user that has yet to be identified) cannot execute the bookmark function among the functions included in an Internet application.

Figure 8:
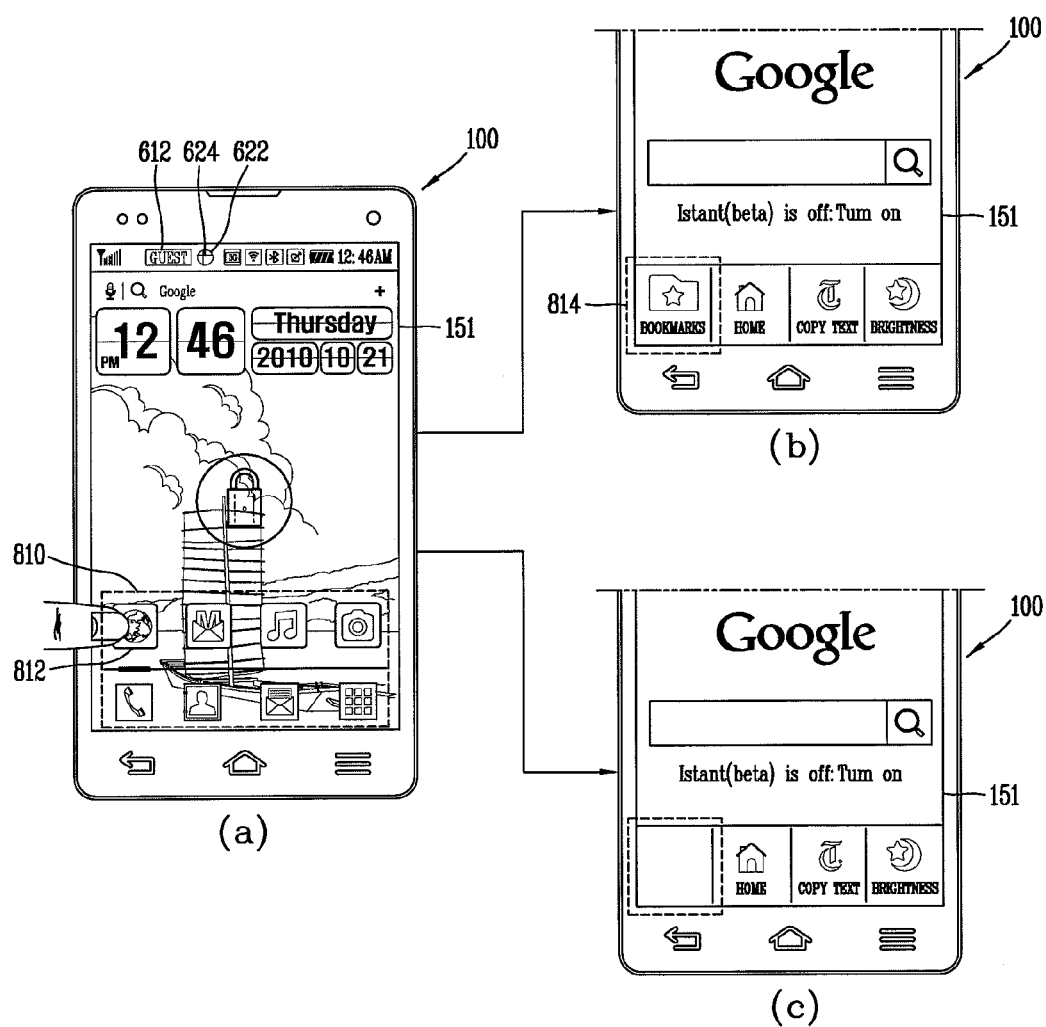
FIGS. 8A to 8C are diagrams illustrating a user interface that is output differently on a user-by-user basis, according to another embodiment.

Next, FIGS. 8A to 8C are diagrams illustrating a user interface that is output differently on a user-by-user basis, according to another embodiment. Referring to FIG. 8A, the mobile terminal 100 is controlled to be in a state where the locked mode is in effect before recognizing the user's face. In this state, the objects 810 are output that correspond to some selected application. In addition, the user can select the objects 812 corresponding to the Internet application by using various input methods such a touch and thus execute the Internet application.

In addition, GUEST 612, the circular indicator 622 indicating a location for exactly recognizing the user's face, and the cross-type indicator 624 are output to the status bar. As described above, the user can make an adjustment for the exact recognition of the face in such a manner that the cross-type indicator 624 is positioned in the middle of the circular indicator 622.

FIG. 8B illustrates a case where the user of the mobile terminal 100 is the owner, and the object corresponding to the Internet application is selected. In addition, icons are output that correspond to all functions including a bookmark function 814, which are included in the Internet application.

FIG. 8C illustrates a case where the user of the mobile terminal 100 is the user other than the owner or a case where the object corresponding to the Internet application is selected before identifying the user. In addition, the icon corresponding to the bookmark function 814 among the functions included in the Internet application is not output. As a result, the user other than the owner cannot use the bookmark function 814.

Next, FIGS. 9A and 9D are display screens illustrating a user interface on which to switch the guest mode to an unlocked mode (if the user is the owner), according to another embodiment.

FIG. 9A illustrates a state in which the locked mode is in effect before recognizing the user's face. In this state, objects 810 are output that correspond to some selected application. At this time, the user can touch on the object 812 corresponding to the Internet application and thus execute the Internet application (entering the guest mode).

In addition, GUEST 612, a circular indicator 622 indicating the location for exactly recognizing the user's face, and the cross-type indicator 624 are output to the status bar.

FIG. 9B illustrates a case where the user of the mobile terminal 100 selects the object corresponding to the Internet application before being identified as the owner. At this time, the icon 814 corresponding to the bookmark function among the functions included in the Internet application is not output. That is, FIG. 9B illustrates the user interface in the guest mode.

FIG. 9C illustrates a case where the user is identified as the owner while executing the Internet application (S552). Accordingly, GUEST 612 is changed to OWNER 614 on the status bar. Then, the circular indicator 622 and the cross-type indicator 624 disappear.

In addition, the icon 814 corresponding to the bookmark function included in the Internet application is output. As a result, the owner can execute the bookmark function.

Figure 9:
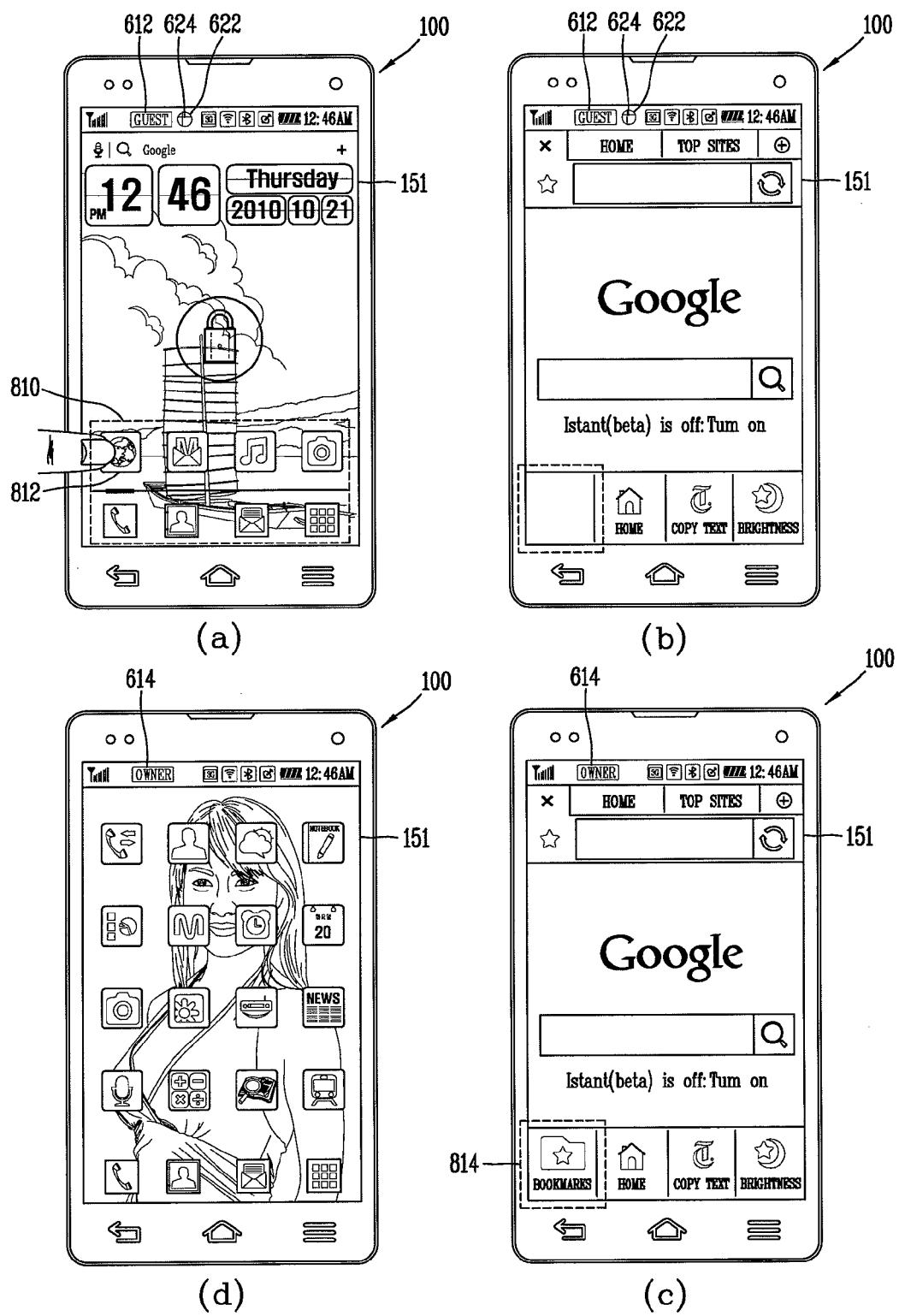
FIGS. 9A to 9D are diagrams illustrating a user interface on which to switch a guest mode to an unlocked mode (if a user is an owner), according to another embodiment.

FIG. 9D illustrates a home screen that is output for the user who is identified as the owner. From comparison with the state of the locked mode being in effect in FIG. 9, it is apparent that the objects corresponding to all applications installed on the mobile terminal 100 are output.

Figure 10:
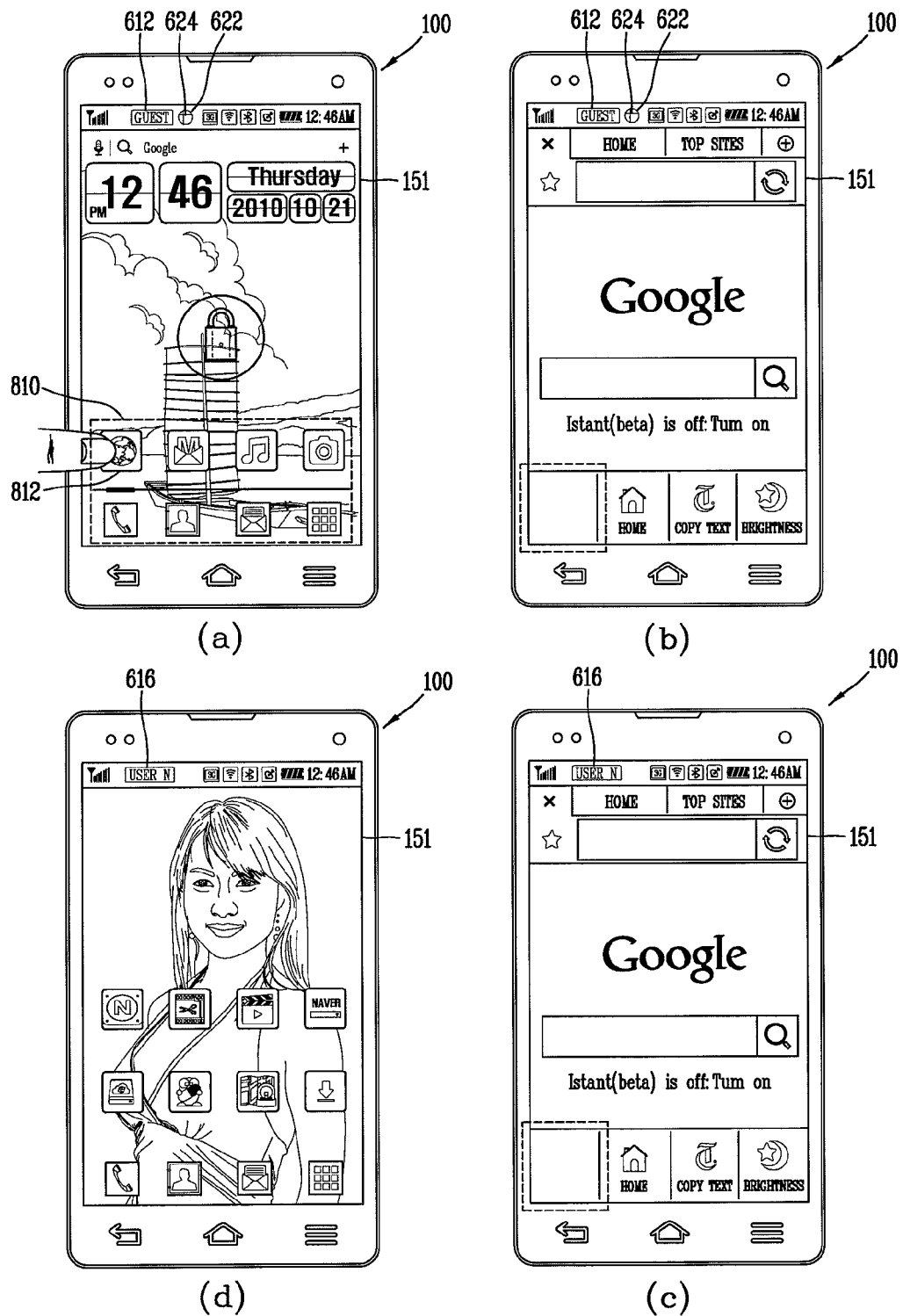
FIGS. 10A to 10D are diagrams illustrating a user interface on which to switch the guest mode to the unlocked mode (if the user is USER N), according to another embodiment.

Next, FIGS. 10A and 10D are diagrams illustrating a user interface on which to switch the guest mode to the unlocked mode (if the user is USER N), according to another embodiment.

FIG. 10A illustrates the state where the locked mode is in effect before recognizing the user's face. In this state, the objects 810 are output that correspond to some selected application. At this time, the user can touch on the object 812 corresponding to the Internet application and execute the Internet application.

In addition, GUEST 612, the circular indicator 622 indicating the location for exactly recognizing the user's face, and the cross-type indicator 624 are output to the status bar.

FIG. 10B illustrates a case where the user of the mobile terminal 100 selects the object corresponding to the Internet application before being identified as USER N. At this time, the icon corresponding to the bookmark function among the functions included in the Internet application is not output. That is, FIG. 10B illustrates the user interface in the guest mode.

FIG. 10C illustrates a case where the user is identified as USER N while executing the Internet application (S556). Accordingly, GUEST 612 is changed to USER 616 on the status bar. Then, the circular indicator 622 and the cross-type indicator 624 disappear.

In addition, since the icon 814 corresponding to the bookmark function included in the Internet application is not output, USER N cannot execute the bookmark function.

FIG. 10D illustrates the home screen that is output for the user who is identified as USER N. From comparison with the state of the locked mode being in effect in FIG. 10A, it is apparent that unlike the object that is output in the locked mode, the objects assigned to USER N are output.

Figure 11:
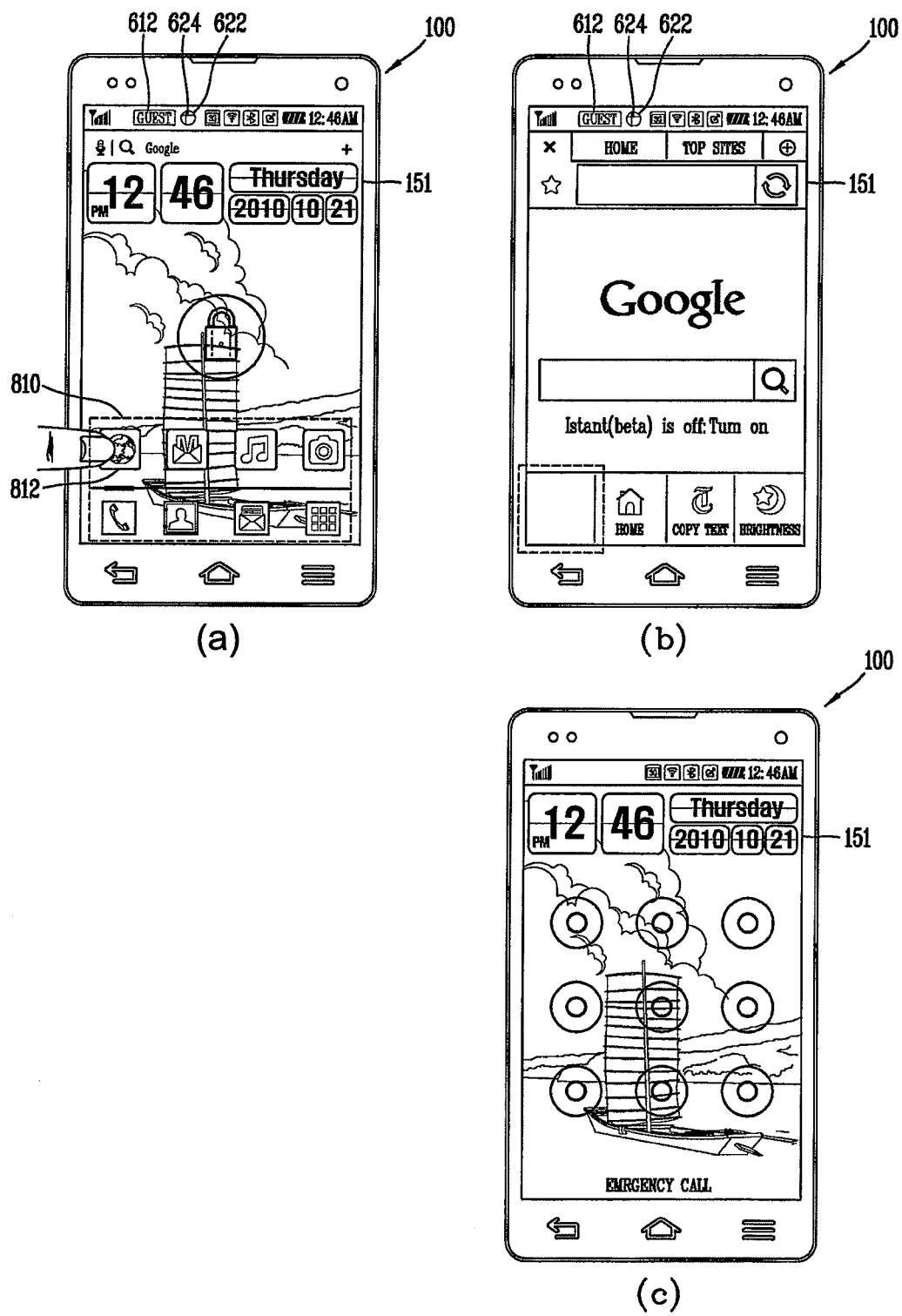
FIGS. 11A to 11C are diagrams illustrating a user interface that is output when it is determined that the user is not authorized to cancel the locked mode, according to another embodiment.

Next, FIGS. 11A to 11C are diagrams illustrating a user interface that is output when it is determined that the user is not authorized to cancel the locked mode, according to another embodiment.

FIG. 11A illustrates the state where the locked mode is in effect before recognizing the user's face. In this state, the objects 810 are output that correspond to some selected application. In addition, the user can touch on the object 812 corresponding to the Internet application, execute the Internet application, and view GUEST 612, the circular indicator 622 indicating the location for exactly recognizing the user's face, and the cross-type indicator 624 on the status bar.

FIG. 11B illustrates the case where the user of the mobile terminal 100 selects the object corresponding to the Internet application before he/she is identified. In addition, the icon corresponding to the bookmark function among the functions included in the Internet application is not output. That is, FIG. 11B illustrates the user interface in the guest mode.

FIG. 11C illustrates a case where the user of the mobile terminal 100 is not recognized as authorized to cancel the locked mode. In this case, an existing interface, such as an interface for inputting a touch pattern, which can cancel the locked mode, may be output (S570).

In addition, according to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet).

In the face unlocking process according to the present invention, the user can view information indicating that the process of canceling the locked mode is in progress and does not need to perform a separate measure (for example, inputting a password or inputting a touch pattern) to cancel the locked mode. This can save time to cancel and improves the user convenience. In addition, in the locked mode, some functions of an assigned application can be executed without canceling the locked mode.

Consequently, limitations of access to an application in a locked mode can be modified to flexibly allow access to features of the application. In addition, the accessible application and the function thereof can be set differently on a user-by-user basis. This makes it possible to enable different users to use the same mobile terminals while protecting their personal information and personal privacy. Thus, one mobile terminal operates as if it were several mobile terminals, each of the mobile terminals being assigned to one user. In addition, an application feature and a user preference can be individually considered because the accessible application can be assigned on a user-by-user basis.

The configuration and the method of the embodiments according to the present invention, described above, are not applied in a limiting manner, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a display;
    a user identification unit configured to identify a user of the mobile terminal as an owner of the mobile terminal or a user other than the owner; and
    a controller configured to:
    control the display to display during a locked mode objects corresponding to a subset of all applications available on the mobile terminal,
    control the display to display icons representing less than all functions available in an application and to hide an icon for each function unavailable in the application when an object corresponding to the application is selected from the objects corresponding to the subset of all applications during the locked mode and when the user of the mobile terminal is yet to be identified as the owner, and
    control the display to display icons representing all functions available in the application including the icon for each function unavailable in the application when the user of the mobile terminal becomes identified as the owner when the object corresponding to the application is selected from the objects corresponding to the subset of all applications during the locked mode.

2. The mobile terminal of claim 1, wherein the user identification unit recognizes and photographs a face of the user facing toward the display with a camera integrated into a main body of the mobile terminal, compares an image of the photographed face of the user against images of multiple users stored in a memory of the mobile terminal, and determines whether the user is authorized to cancel the locked mode.

3. The mobile terminal of claim 2, wherein the controller outputs an object indicating whether the user of the mobile terminal is authorized to cancel the locked mode to the display.

4. The mobile terminal of claim 2, wherein the controller outputs an identification object individually assigned to the user if the user is authorized to cancel the locked mode to the display.

5. The mobile terminal of claim 2, wherein the controller outputs an indicator indicating a location of a face of the user with respect to the display.

6. The mobile terminal of claim 2, wherein the controller outputs a region for recognizing the face of the user to the display.

7. The mobile terminal of claim 2, wherein the controller outputs an image effect indicating an extent to which a region where the face of the user is currently recognized matches with a region for recognizing the face of the user to the display.

8. The mobile terminal of claim 2, wherein the controller outputs an extent of image processing associated with the image of the face of the user to the display.

9. The mobile terminal of claim 1, wherein the display outputs different user identification information corresponding to a plurality of users authorized to cancel the lock mode, respectively.

10. A method of controlling a mobile terminal, comprising:
    outputting, on a display of the mobile terminal in a locked mode, objects corresponding to a subset of all applications available on the mobile terminal;
    identifying a user of the mobile terminal as an owner of the mobile terminal or a user other than the owner;
    displaying icons representing less than all functions available in an application and hiding an icon for each function unavailable in the application when an object corresponding to the application is selected from the objects corresponding to the subset of all applications during the locked mode and when the user of the mobile terminal is yet to be identified as the owner; and
    displaying, on the display, icons representing all functions available in the application including the icon for each function unavailable in the application when the user of the mobile terminal becomes identified as the owner when the object corresponding to the application is selected from the objects corresponding to the subset of all applications during the locked mode.

11. The method of claim 10, wherein the identifying of the user includes recognizing and photographing a face of the user facing toward the display with a camera integrated into a main body of the mobile terminal, comparing an image of the photographed face of the user against images of multiple users stored in a memory of the mobile terminal, and determining whether the user is authorized to cancel the locked mode.

12. The method of claim 11, further comprising:
    outputting an object indicating whether the user is authorized to cancel the locked mode to the display.

13. The method of claim 11, further comprising:
    outputting an identification object individually assigned to the user if the user is authorized to cancel the locked mode to the display.

14. The method of claim 11, further comprising:
outputting an indicator indicating a location of a face of the user with respect to the display.

15. The method of claim 11, further comprising:
outputting a region for recognizing the face of the user to the display.

16. The method of claim 11, further comprising:
outputting an image effect indicating an extent to which a region where the face of the user currently recognized matches with a region for recognizing the face of the user to the display.

17. The method of claim 11, further comprising:
outputting an extent of image processing associated with the image of the face of the user to the display.

18. The method of claim 10, further comprising:
outputting different user identification information corresponding to a plurality of users authorized to cancel the lock mode, respectively, to the display.

* * * * *